May 4, 1965  E. H. TODER ETAL  3,182,238
ENCASED TUBULAR CAPACITOR
Filed Feb. 5, 1962

*INVENTORS*
ERIC H. TODER
VICTOR E.W. BOND
BY
*Connolly and Hutz*
THEIR ATTORNEYS

United States Patent Office 3,182,238
Patented May 4, 1965

3,182,238
ENCASED TUBULAR CAPACITOR
Eric H. Toder, Ruislip, Middlesex, and Victor E. W. Bond, Windsor, Berkshire, England, assignors to Sprague Electric Company, North Adams, Mass., a corporation of Massachusetts
Filed Feb. 5, 1962, Ser. No. 171,023
7 Claims. (Cl. 317—260)

The present invention relates generally to electrostatic capacitors, and more particularly to electrostatic capacitors designed to withstand mechanical shock and vibration.

When a capacitor is employed as a component part of a device which during normal operation vibrates and/or moves about, e.g., a vacuum cleaner, the capacitor must be able to withstand physical abuse. Obviously if the capacitor element is not firmly anchored within its container failure will occur in short order. The soldered connections are particularly susceptible to separation due to vibration and mechanical shock. Even more serious than separation of the soldered connection is severance of the metal lug or tab to which a lead is soldered due to metal fatigue or simple tearing.

Among the many electrical requirements imposed upon capacitors of the instant type is that there be sufficient insulation between the lead connections and the metal container so that a flash test voltage of 1500 v. R.M.S. is tolerated.

The present invention meets and overcomes several of the attendant problems by means of the particular capacitor design described in more detail below.

It is therefore an object of the instant invention to provide a new and novel electrostatic capacitor capable of withstanding sustained vibration and shock.

It is another object of this invention to fabricate an electrostatic capacitor having lead connections secured against sustained vibration and shock.

Yet another object of this invention is to provide a novel, compact electrosatic capacitor inhibited against lead flashover.

These and other objects of this invention will be apparent from the following description and drawings in which.

Broadly speaking the objects of the present invention are achieved by placing over either or each end of the operative element an insulating cap. The operative element is then placed in a container, which generally conforms to the shape of said operative element, and at least one internal beading is formed on the container in such a location as to bear on the cap or caps and hold the element in place within the container. The end cap and the container which conforms to the shape of the operative element may be of circular, square or rectangular cross section. The internal beading may be conveniently formed by a spinning operation.

The caps are made, for instance, by molding a nonbrittle material which is preferably somewhat resilient. Suitable materials may be polyethylene, polyvinyl chloride, other similar plastic substances, natural or synthetic rubber, etc.

The caps should be of such dimensions and shape as to be an easy fit over the capacitor element, thus, a slight latitude is desirable to allow for reception of elements of moderately varying size. The external dimensions, however, should be such that a fairly snug fit is maintained between the cap and the interior wall of the can or container. Lead wire openings are provided for in the caps during formation thereof.

If the container be initially closed at one end, a single beading is sufficient, this being formed after insertion of the capacitor element; if the container be initially open at both ends, two beadings are required, one being preferably formed first to constitute an abutment for the capacitor element, and the second after insertion of the element into the container. In any case the distance between the bottom of the container and the beading, or between the two beadings, is such as just to accommodate the element and its caps, or even to slightly compress this assembly, thus preventing its longitudinal movement.

In order that the invention may be clearly understood and readily carried into effect, it will now be described more fully with reference to the accompanying drawing, which shows, by way of example and in longitudinal section, two forms of capacitor in accordance therewith.

Figure 1:
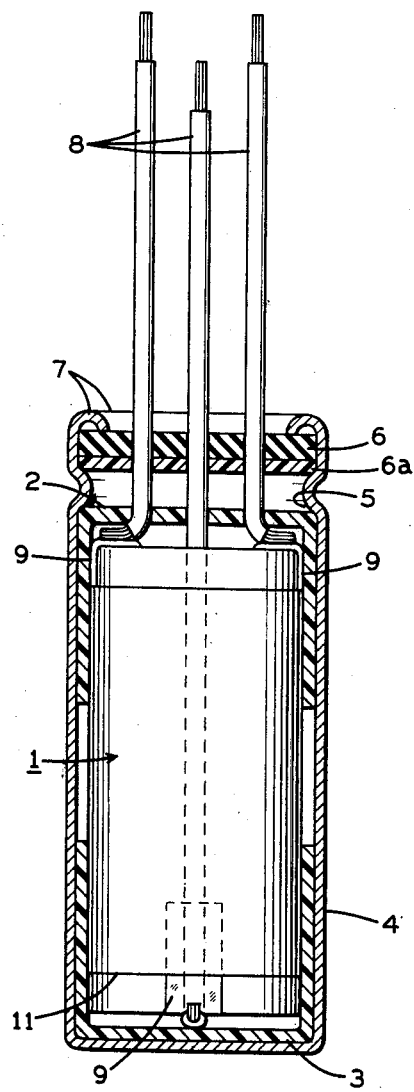
FIGURE 1 is a side view, in longitudinal section, of a multisection electrostatic capacitor.

In FIGURE 1, an electrostatic capacitor element 1, is a two section convolutely tab-wound, oil-impregnated capacitor section. Tab ends 9 are bent down and held against the sides of the section by a paper wrapper 11, the width of which is somewhat less than the length of the section. This insures a solid surface for each tab at the ends of the section during the soldering of lead wires 8. Opposite ends are provided with caps 2 and 3 suitably of any insulating material such as those disclosed above. The capped element is placed in can 4, appropriately of aluminum. An internal beading 5 is then formed in such a position as to bear on cap 2 and thus retain element 1 firmly in position. The open end of the container is closed by composite discs of rubber 6 and some suitably hard backing material 6a, for example a phenolic material. These are retained in place and sealed by spinning over the marginal edge 7 of the container.

Figure 2:
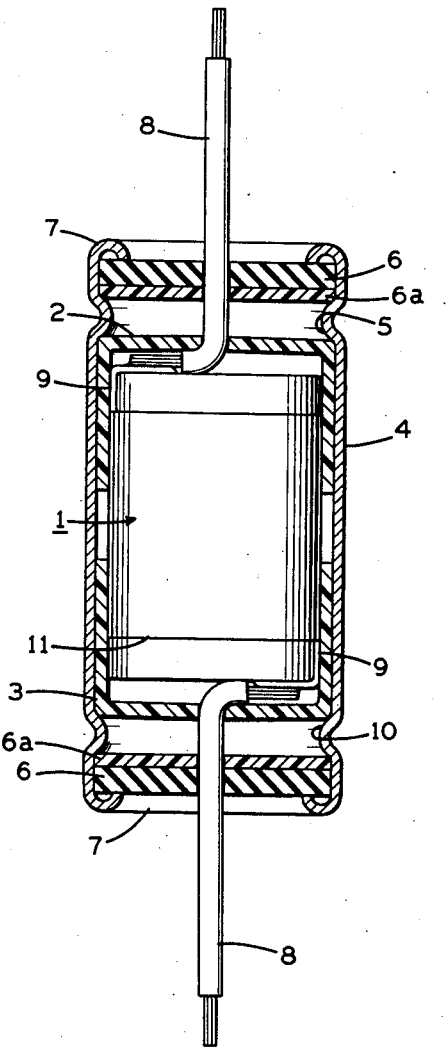
FIGURE 2 is a side view, in longitudinal section, of a single section electrostatic capacitor.

In the construction depicted in FIGURE 2 both ends of the container 4 are initially open and the capacitor element 1 is retained in position by means of a second beading 10 spaced to bear on the cap 3, either or both of the beadings 5 and 10 being formed after introduction of the element 1 into the container 4; closure of the container is effected by the composite discs 6 and 6a at each end. This construction is especially suitable when as shown, the leads 8 extend from opposite ends of the capacitor.

As can be readily seen the inventive caps insure a capacitor assembly capable of sustained operation under the most adverse conditions of vibration and mechanical shock.

Various modifications may be made in the instant invention without departing from the spirit and scope thereof as defined in the appended claims.

What is claimed is:

1. An electrostatic capacitor unit comprising a metal casing, an oil-impregnated rolled capacitor section located therein, over and about at least one end of said section is fitted a cap of insulating material held in place against said end by an internal beading formed in said casing, said cap having lead openings receiving lead wires, a closure member positioned in at least one end of said casing.

2. In an electrostatic capacitor unit the combination of a convolutely wound, oil-impregnated capacitor section in a metal can, a cap of insulating material fitted over and about the lead end of said section and held in place against said end by an internal beading formed in said can, said cap having lead openings receiving lead wires, a closure member positioned at the end of the can and sealed by a spinning of the can end.

3. In an electrostatic capacitor unit the combination of a convolutely wound oil-impregnated, multisection capacitor in a metal can, caps of insulating material fitted over and about the ends of said capacitor and held in place against said ends by an internal beading formed near the lead end of said can, the lead-end cap having lead openings receiving lead wires, a closure member positioned at the end of the can and sealed by a spinning of the can end.

4. In an electrostatic capacitor unit the combination of a convolutely wound oil-impregnated capacitor section in a metal casing, caps of insulating material fitted over and about the ends of said section and held in place by internal beading formed in said casing, said caps having lead openings receiving lead wires, closure members positioned at both ends of the casing and sealed by a spinning of the casing ends.

5. In an electrostatic capacitor unit the combination of a convolutely tab-wound, oil-impregnated capacitor section in a metal can, the tab ends being held down and against the sides of said section by a paper wrapper, lead wires soldered to the tabs at the end of said section, a cap of resilient insulating material fitted over and about the lead end of said section and held in place against said end by an internal beading formed in said can, said cap having lead openings receiving lead wires, a closure member positioned at the end of the can and sealed by a spinning of the can end.

6. In an electrostatic capacitor unit the combination of a convolutely tab-wound, oil-impregnated, multisection capacitor in a metal can, the tab ends being held down and against the sides of said capacitor by a paper wrapper, lead wires soldered to the tabs at the end of said capacitor, caps of resilient insulating material fitted over and about the ends of said capacitor and held in place against said ends by an internal beading formed near the lead end of said can, the lead end cap having lead openings receiving lead wires, a closure member positioned at the end of the can and sealed by a spinning of the can end.

7. In an electrostatic capacitor unit the combination of a convolutely tab-wound, oil-impregnated capacitor section in a metal casing, the tab ends being held down and against the sides of said section by a paper wrapper, lead wires soldered to the tabs at the ends of said section, caps of resilient insulating material fitted over and about the ends of said section and held in place by internal beadings formed in said casing, said caps having lead openings receiving lead wires and closure members positioned at both ends of the casing.

References Cited by the Examiner

UNITED STATES PATENTS

| | | | |
|---|---|---|---|
| 1,395,931 | 11/21 | Smith | 317—260 |
| 1,829,015 | 10/31 | Reiher | 317—260 |
| 1,991,707 | 2/35 | Silbermann | 317—260 |
| 2,029,430 | 2/36 | Kopinski | 317—260 |
| 2,445,196 | 7/48 | West | 174—50.52 |
| 2,819,492 | 1/58 | Cummin et al. | |
| 2,825,855 | 3/58 | Frekko | 317—242 |

JOHN F. BURNS, *Primary Examiner.*